United States Patent
Futae et al.

(10) Patent No.: US 11,460,042 B2
(45) Date of Patent: Oct. 4, 2022

(54) FLOATING BUSH BEARING DEVICE AND SUPERCHARGER

(71) Applicant: MITSUBISHI HEAVY INDUSTRIES ENGINE & TURBOCHARGER, LTD., Sagamihara (JP)

(72) Inventors: Takaya Futae, Tokyo (JP); Yosuke Dammoto, Sagamihara (JP); Jun Suzuki, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 17/433,508

(22) PCT Filed: Feb. 27, 2019

(86) PCT No.: PCT/JP2019/007570
§ 371 (c)(1),
(2) Date: Aug. 24, 2021

(87) PCT Pub. No.: WO2020/174611
PCT Pub. Date: Sep. 3, 2020

(65) Prior Publication Data
US 2022/0145900 A1 May 12, 2022

(51) Int. Cl.
*F04D 29/42* (2006.01)
*F04D 17/10* (2006.01)
(Continued)

(52) U.S. Cl.
CPC ......... *F04D 29/4206* (2013.01); *F04D 17/10* (2013.01); *F04D 29/046* (2013.01); *F04D 29/22* (2013.01); *F16C 17/02* (2013.01)

(58) Field of Classification Search
CPC .... F04D 29/4206; F04D 17/10; F04D 29/046; F04D 29/22; F16C 17/02
(Continued)

(56) References Cited

U.S. PATENT DOCUMENTS 3,056,634 A * 10/1962 Woollenweber, Jr. .. F16C 27/02
417/407
4,358,253 A * 11/1982 Okano ............... F01D 25/166
417/407
(Continued)

FOREIGN PATENT DOCUMENTS

DE  10 2009 007 696 A1  8/2010
DE  10 2017 213 492 A1  2/2019
(Continued)

OTHER PUBLICATIONS

International Preliminary Report on Patentability and Written Opinion of the International Searching Authority for International Application No. PCT/JP2019/007570, dated Aug. 25, 2021, with English translation.
(Continued)

*Primary Examiner* — Logan M Kraft
*Assistant Examiner* — John D Bailey
(74) *Attorney, Agent, or Firm* — Birch, Stewart, Kolasch & Birch, LLP

(57) ABSTRACT

A floating bush bearing configured to support a rotational shaft rotatably includes: a floating bush body part formed to have a cylindrical shape having an insertion hole through which the rotational shaft is inserted. The floating bush body part includes: an inner peripheral surface; an outer peripheral surface having a greater width dimension than the inner peripheral surface in an axial direction of the floating bush body part; and an axial end surface which connects an end of the inner peripheral surface and an end of the outer
(Continued)

peripheral surface, the axial end surface including a vertical surface extending along a direction orthogonal to the axial direction from the end of the outer peripheral surface toward a radially inner side and an oblique surface extending from a radially inner end of the vertical surface toward the end of the inner peripheral surface. The oblique surface has a protruding portion protruding from a virtual line which linearly connects the radially inner end of the vertical surface and the end of the inner peripheral surface.

6 Claims, 6 Drawing Sheets

(51) Int. Cl.
   *F04D 29/22* (2006.01)
   *F04D 29/046* (2006.01)
   *F16C 17/02* (2006.01)

(58) Field of Classification Search
   USPC .......................................................... 415/203
   See application file for complete search history.

(56) References Cited

U.S. PATENT DOCUMENTS

| | | | | |
|---|---|---|---|---|
| 4,371,219 A * | 2/1983 | Yamane | ................ | F01D 25/166 384/291 |
| 4,479,728 A * | 10/1984 | Miller | ................... | F01D 25/168 384/369 |
| 4,602,873 A * | 7/1986 | Izumi | .................... | F16C 17/028 384/118 |
| 4,640,630 A * | 2/1987 | Yoshioka | ............. | F16C 23/041 384/129 |
| 4,969,805 A * | 11/1990 | Romeo | ................. | F01D 25/285 417/407 |
| 5,454,646 A * | 10/1995 | Reisdorf | ................ | F16C 17/02 417/407 |
| 6,056,509 A * | 5/2000 | Nakayama | ........... | B63H 21/386 416/174 |
| 6,126,414 A * | 10/2000 | Koike | ..................... | F16C 17/04 417/407 |
| 7,793,499 B2 * | 9/2010 | Gutknecht | ............. | F16C 17/26 60/605.1 |
| 9,587,515 B2 * | 3/2017 | Nishida | ................. | F01D 25/166 |
| 9,638,059 B2 * | 5/2017 | Becker | ................ | F16C 33/1065 |
| 9,897,137 B2 * | 2/2018 | Kojima | .................... | F16C 17/10 |
| 10,330,152 B2 * | 6/2019 | Futae | ....................... | F16C 17/02 |
| 10,526,960 B2 * | 1/2020 | Kojima | ................... | F01D 25/16 |
| 2006/0051003 A1 * | 3/2006 | Nii | ......................... | F16C 17/028 384/114 |
| 2012/0237149 A1 * | 9/2012 | Uesugi | .................... | F16C 17/18 384/397 |
| 2014/0044540 A1 * | 2/2014 | Uneura | ............... | F16C 32/0629 384/121 |
| 2014/0119898 A1 * | 5/2014 | Nishida | ................... | F02B 39/14 415/170.1 |
| 2014/0341710 A1 * | 11/2014 | Creamer | ............... | F04D 27/007 415/203 |
| 2016/0298535 A1 * | 10/2016 | Hettinger | ................ | F02B 39/14 |
| 2017/0074278 A1 * | 3/2017 | Watanabe | ............. | F04D 29/023 |
| 2017/0159708 A1 * | 6/2017 | Uneura | ................... | F16C 27/02 |
| 2018/0003105 A1 * | 1/2018 | Kojima | ................... | F02B 39/14 |
| 2018/0030988 A1 * | 2/2018 | Garrard | ................ | F16C 17/26 |
| 2019/0153895 A1 * | 5/2019 | Sugiura | ................... | F01D 25/16 |
| 2019/0186538 A1 * | 6/2019 | Sugiura | .................. | F02B 39/00 |

FOREIGN PATENT DOCUMENTS

| | | |
|---|---|---|
| EP | 1 998 009 A1 | 12/2008 |
| EP | 3 112 707 A1 | 1/2017 |
| JP | 57-129919 A | 8/1982 |
| JP | 62-93420 U | 6/1987 |
| JP | 63-87320 U | 6/1988 |
| JP | 2008-190498 A | 8/2008 |
| JP | 4969531 B2 | 7/2012 |
| JP | 5705665 B2 | 4/2015 |
| WO | WO 2018/062400 A1 | 4/2018 |

OTHER PUBLICATIONS

International Search Report for International Application No. PCT/JP2019/007570, dated May 7, 2019.
Office Action dated May 24, 2022 issued in counterpart German Application No. 11 2019 006 709.5.

* cited by examiner

FLOATING BUSH BEARING DEVICE AND SUPERCHARGER

TECHNICAL FIELD

The present disclosure relates to a floating bush bearing configured to rotatably support a rotational shaft, and a supercharger provided with the floating bush bearing.

BACKGROUND ART

As a bearing that rotatably supports a rotational shaft, a floating bush bearing is known, which includes a floating bush body part having a cylindrical shape that has an insertion hole into which a rotational shaft is inserted (see Patent Document 1, for instance). The floating bush bearing is configured to support the rotational shaft rotatably via a liquid film formed by a lubricant oil filling the gap between the floating bush body part and the rotational shaft.

In the invention disclosed in Patent Document 1, the floating bush body part includes an inner peripheral surface, an outer peripheral surface which has a greater width dimension than the inner peripheral surface in the axial direction, and an axial end surface which connects an end of the inner peripheral surface and an end of the outer peripheral surface. The axial end surface has a vertical surface which extends in a direction orthogonal to the axial direction toward the radially inner side from the end of the outer peripheral surface, and a linear oblique surface which linearly connects the radially inner end of the vertical surface and the end of the inner peripheral surface.

CITATION LIST

Patent Literature

Patent Document 1: JP5705665B

SUMMARY

Problems to be Solved

The floating bush body part has an oil supply hole which brings the inner peripheral surface and the outer peripheral surface of the floating bush body part into communication. A lubricant oil is introduced, via the above oil supply hole, to the gap between the floating bush body part and the rotational shaft, from the outer side in the radial direction. The floating bush bearing supports the rotational shaft so as to be relatively rotatable, and the floating bush body part rotates in conjunction with rotation of the rotational shaft. Thus, when the rotational shaft rotates at a high speed, a great eccentric force acts on the floating bush body part toward the outer side in the radial direction. The above eccentric force acts on the lubricant oil passing through the oil supply hole in a direction opposite to the introducing direction, and thus the supply amount of the lubricant oil to the gap may decrease. Insufficiency in the supply amount of the lubricant oil to the gap may cause seizure or damage to the floating bush body part.

Meanwhile, the lubricant oil could be introduced into the gap from the outer side in the axial direction. However, when the rotational shaft rotates at a high speed, the lubricant oil positioned between the linear oblique surface of the floating bush body part and the outer peripheral surface of the rotational shaft has a higher pressure at the radially inner side than at the radially outer side, which generates a flow that flows toward the outer side in the radial direction. Thus, most of the lubricant oil flowing along the rotational shaft from the axially outer side toward the axial center side turns outward in the radial direction, and flows backward toward the outer side in the axial direction along the linear oblique surface, which may cause insufficiency in the supply amount of the lubricant oil to the gap, and thereby seizure and damage to the floating bush body part.

In view of the above, an object of at least one embodiment of the present invention is to provide a floating bush bearing which can increase the supply amount of the lubricant oil to the gap between the inner peripheral surface of the floating bush body part and the outer peripheral surface of the rotational shaft, and prevent seizure and damage to the floating bush body part.

Solution to the Problems (1) According to an embodiment of the present invention, a floating bush bearing configured to support a rotational shaft rotatably includes: a floating bush body part formed to have a cylindrical shape having an insertion hole through which the rotational shaft is inserted. The floating bush body part includes: an inner peripheral surface; an outer peripheral surface having a greater width dimension than the inner peripheral surface in an axial direction of the floating bush body part; and an axial end surface which connects an end of the inner peripheral surface and an end of the outer peripheral surface, the axial end surface including a vertical surface extending along a direction orthogonal to the axial direction from the end of the outer peripheral surface toward a radially inner side and an oblique surface extending from a radially inner end of the vertical surface toward the end of the inner peripheral surface. The oblique surface has a protruding portion protruding from a virtual line which linearly connects the radially inner end of the vertical surface and the end of the inner peripheral surface.

When the rotational shaft rotates at a high speed, the lubricant oil positioned between the oblique surface of the floating bush body part and the outer peripheral surface of the rotational shaft has a higher pressure at the radially inner side than the radially outer side, which generates a flow that flows toward the radially outer side due to the pressure difference. With the above configuration (1), the oblique surface of the floating bush bearing has the protruding portion protruding from the virtual line connecting the radially inner end of the vertical surface and the end of the inner peripheral surface. Thus, it is possible to suppress a reverse flow of the lubricant oil, positioned between the oblique surface of the floating bush body part and the outer peripheral surface of the rotational shaft, that flows backward toward the outer side in the axial direction along the oblique surface. By suppressing a reverse flow of the lubricant oil flowing along the axial direction from the outer side of the axial direction, it is possible to increase the supply amount of the lubricant oil to the gap between the inner peripheral surface of the floating bush body part and the outer peripheral surface of the rotational shaft, and thereby prevent seizure and damage to the floating bush body part.

(2) In some embodiments, in the floating bush bearing according to the above (1), the oblique surface includes: an axial center side linear portion which extends linearly from the end of the inner peripheral surface and which is formed to have a smaller obliquity angle with respect to an axis of the floating bush body part than the virtual line; and an axial end side linear portion which is formed so as to linearly connect a tip end of the axial center side linear portion and the radially inner end of the vertical surface.

With the above configuration (2), the oblique surface has the axial center side linear portion extending linearly from the end of the inner peripheral surface and having a smaller obliquity angle with respect to the axis of the floating bush body part than the virtual line. Thus, it is possible to effectively suppress a reverse flow of the lubricant oil, positioned between the oblique surface of the floating bush body part and the outer peripheral surface of the rotational shaft, that flows backward toward the outer side in the axial direction along the axial center side linear portion (oblique surface).

Furthermore, the oblique surface includes the axial end side linear portion formed so as to linearly connect the tip end of the axial center side linear portion and the radially inner end of the vertical surface. The axial end side linear portion has a larger obliquity angle with respect to the axis of the floating bush body part than the virtual line, and thus it is possible to increase the introduction amount of the lubricant oil flowing along the axial direction from the outer side in the axial direction, and thereby increase the supply amount of the lubricant oil to the above described gap. Furthermore, the axial end side linear portion has a greater obliquity angle with respect to the axis of the floating bush body part than the axial center side linear portion, and thus it is possible to reduce the rotation drag of the rotational shaft compared to a case in which the axial end side linear portion extends along the axial center side linear portion, and thereby reduce rotational loss of the rotational shaft.

(3) In some embodiments, in the floating bush bearing according to the above (1), the oblique surface includes a concave curved surface portion formed so as to connect the radially inner end of the vertical surface and the end of the inner peripheral surface.

With the above configuration (3), the above described oblique surface includes a concave curved surface portion formed so as to connect the radially inner end of the vertical surface and the end of the inner peripheral surface. Herein, a portion of the concave curved surface portion positioned at the axial center side of the most protruding portion of the concave curved surface portion from the virtual line LC is an axial center side concave curved surface portion, and a portion positioned at the axial end side of the most protruding portion is an axial end side concave curved surface portion. The axial center side concave curved surface portion has a tangent to the axial center side concave curved surface portion having a smaller obliquity angle with respect to the axis of the floating bush body part than the virtual line. Thus, it is possible to effectively suppress a reverse flow of the lubricant oil, positioned between the axial center side concave curved surface portion of the floating bush body part and the outer peripheral surface of the rotational shaft, that flows backward toward the outer side in the axial direction along the axial center side concave curved surface portion (oblique surface).

Furthermore, the axial end side concave curved surface portion has a tangent to the axial end side concave curved surface portion having a larger obliquity angle with respect to the axis of the floating bush body part than the virtual line, and thus it is possible to increase the introduction amount of the lubricant oil flowing along the axial direction from the outer side in the axial direction, and thereby increase the supply amount of the lubricant oil to the above described gap. Furthermore, the axial end side concave curved surface portion has a tangent to the axial end side concave curved surface portion having a greater obliquity angle with respect to the axis of the floating bush body part than the axial center side concave curved surface portion, and thus it is possible to reduce the rotation drag of the rotational shaft compared to a case in which the axial end side concave curved surface portion extends along the axial center side concave curved surface portion, and thereby reduce rotational loss of the rotational shaft.

(4) In some embodiments, in the floating bush bearing according to the above (2) or (3), when a line passing through a midpoint of the virtual line and being orthogonal to the virtual line is a virtual normal, the protruding portion is configured such that a portion most protruding from the virtual line is positioned at the side closer to an axial center with respect to the virtual normal.

With the above configuration (4), the protruding portion is configured such that the most protruding portion from the virtual line is positioned at the axial center side of the virtual normal. That is, the axial end side linear portion and the axial end side concave curved surface portion of the oblique surface are longer. In this case, compared to a case in which the most protruding portion is positioned at the axial end side of the virtual normal, it is possible to increase the introduction amount of the lubricant oil flowing along the axial direction from the outer side in the axial direction, and increase the supply amount of the lubricant oil to the above described gap. Furthermore, with the above configuration, it is possible to reduce rotational drag of the rotational shaft with the most protruding portion, and thus it is possible to reduce rotational loss of the rotational shaft.

(5) In some embodiments, in the floating bush bearing according to one of the above (1) to (4), the oblique surface has at least one spiral groove which extends in a rotational direction of the floating bush bearing while turning toward the radially inner side.

With the above configuration (5), the oblique surface has at least one spiral groove which extends in the rotational direction of the floating bush bearing while turning toward the radially inner side, and thus, when the floating bush bearing rotates, a force acts on the lubricant oil entering the inside of the spiral groove, such that the force pushes the lubricant oil toward the downstream side of the rotational direction from the wall surface of the spiral groove. Thus, with the above configuration, it is possible to increase the supply amount of the lubricant oil to the above described gap, compared to a case in which the spiral groove is not provided.

(6) According to at least one embodiment of the present invention, a supercharger includes: a rotational shaft; a compressor wheel mounted to an end of the rotational shaft; the floating bush body part of the floating bush bearing according to any one of the above (1) to (5); and a housing configured to house the rotational shaft, the compressor wheel, and the floating bush body part.

With the above configuration (6), the supercharger includes the rotational shaft, the compressor wheel, the floating bush body part of the floating bush bearing, and the housing. Thus, it is possible to increase the supply amount of the lubricant oil to the gap between the inner peripheral surface of the floating bush body part and the outer peripheral surface of the rotational shaft, and thereby prevent seizure and damage to the floating bush body part.

Advantageous Effects

According to at least one embodiment of the present invention, it is possible to provide a floating bush bearing which can increase the supply amount of the lubricant oil to the gap between the inner peripheral surface of the floating bush body part and the outer peripheral surface of the rotational shaft, and prevent seizure and damage to the floating bush body part.

DETAILED DESCRIPTION

Figure 1:
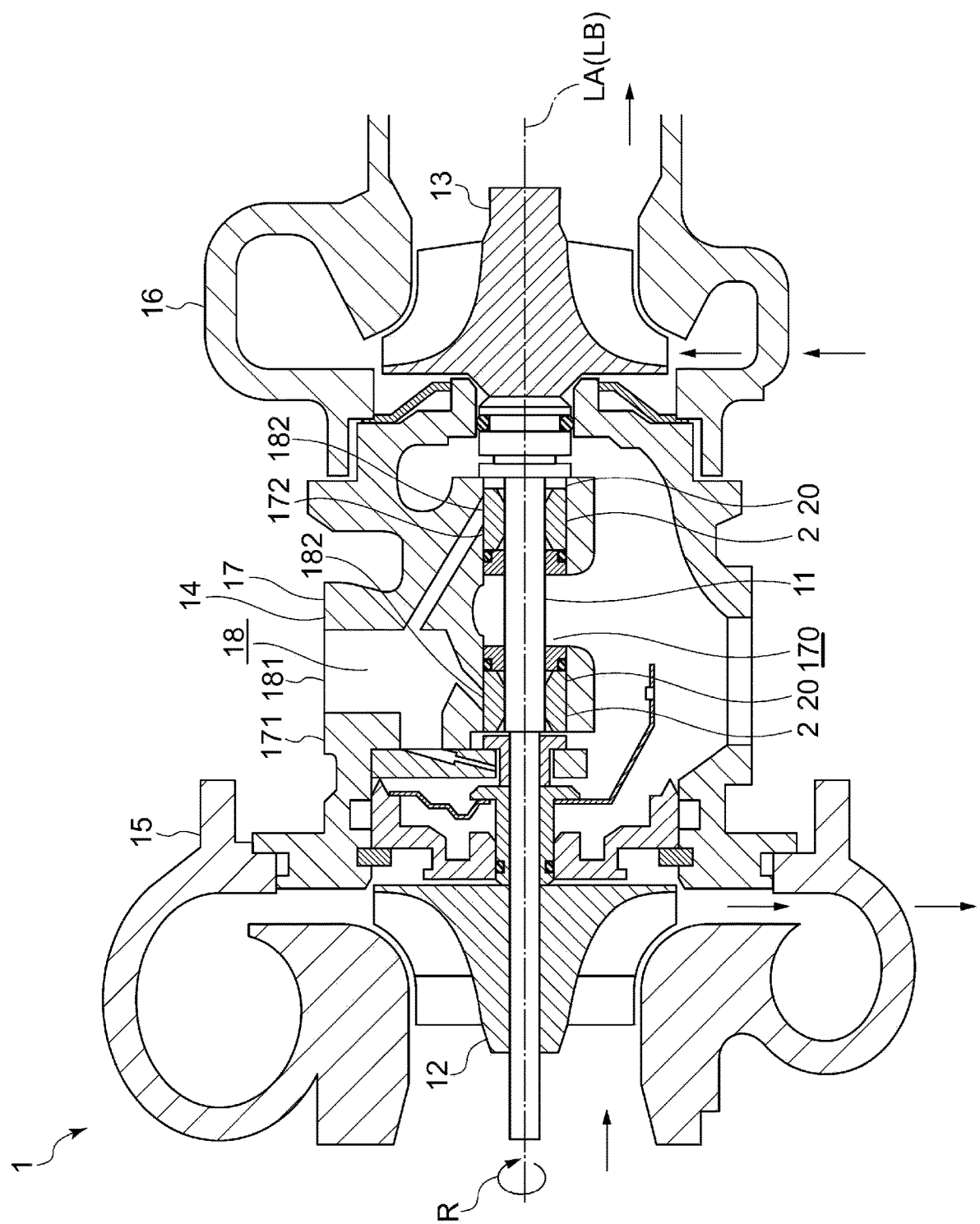
FIG. 1 is a schematic cross-sectional view of a supercharger having a floating bush bearing according to an embodiment, taken along the axis of the supercharger.

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The same features may be indicated by the same reference numerals and not described in detail.

FIG. 1 is a schematic cross-sectional view of a supercharger having a floating bush bearing according to an embodiment, taken along the axis of the supercharger. The arrows in FIG. 1 indicate flow directions of air and exhaust gas.

As depicted in FIG. 1, a floating bush bearing 2 according to some embodiments includes a floating bush body part 20, and is configured to support the rotational shaft 11 rotatably. In the depicted embodiment, the floating bush bearing 2 is, as depicted in FIG. 1, configured to support the radial load of the rotational shaft 11, and mounted to a supercharger 1 as a journal bearing.

As depicted in FIG. 1, the supercharger 1 includes: the above described rotational shaft 11 extending along the axis LA; a compressor wheel 12 mounted to an end of the rotational shaft 11 in the extension direction (the left end in the drawing); the at least one floating bush body part 20 mounted to the rotational shaft 11 at a position closer to the center than the compressor wheel 12 in the axial direction (in the direction of extension of the axis LA) so as to be relatively rotatable with respect to the rotational shaft 11; and a housing 14 configured to accommodate the compressor wheel 12 and the at least one floating bush body part 20.

In the depicted embodiment, the supercharger 1 includes a turbocharger, and further includes a turbine wheel 13 mounted to the other end of the rotational shaft 11 in the extension direction (the right end in the drawing), as depicted in FIG. 1.

In the depicted embodiment, the housing 14 includes, as depicted in FIG. 1, a compressor housing 15 configured to accommodate the compressor wheel 12, a turbine housing 16 configured to accommodate the turbine wheel 13, and a bearing housing 17 configured to accommodate the at least one floating bush body part 20. The bearing housing 17 is disposed between the compressor housing 15 and the turbine housing 16 in the axial direction. The bearing housing 17 has an end coupled and fixed to the compressor housing 15, and the other end coupled and fixed to the turbine housing 16, via non-depicted fastening devices. A fastening device may include a bolt, a nut, and a V-clamp, for instance.

The supercharger 1 (turbocharger) is configured to rotate the turbine wheel 13 with exhaust gas introduced into the turbine housing 16 from an internal combustion engine (combustion device) such as an engine, and rotate the compressor wheel 12 coupled to the turbine wheel 13 via the rotational shaft 11. The supercharger 1 (turbocharger) is configured to compress air (combustion gas) introduced into the compressor housing 15, generate compression gas, and send the compressed air to the above described internal combustion engine, by rotating the compressor wheel 12.

In the depicted embodiment, the turbine housing 16 is configured to, as depicted in FIG. 1, receive exhaust gas introduced from the outer side in the radial direction (a direction orthogonal to the axis LA) and discharge the exhaust gas after rotating the turbine wheel 13 to the outer side along the axial direction. Furthermore, the compressor housing 15 is configured to, as depicted in FIG. 1, receive air introduced from the outer side in the axial direction, and discharge the air having passed through the compressor wheel 12 and a diffuser flow passage to the outer side along the radial direction.

The bearing housing 17 has, as depicted in FIG. 1, an internal space 170 formed therein, which is configured such that the rotational shaft 11 is insertable through the internal space 170 along the axial direction. The bearing housing 17 is configured to accommodate at least one (two in FIG. 1) floating bush body part 20 in the internal space 170.

The bearing housing 17 has, as depicted in FIG. 1, an oil supply flow passage 18 formed therein, for letting the lubricant oil flow from outside of the bearing housing 17 to the internal space 170. The bearing housing 17 includes an introduction port 181 formed on an outer surface 171 of the bearing housing 17 to introduce the lubricant oil to the oil supply flow passage 18, and a discharge port 182 formed on an inner surface 172 of the bearing housing 17 to discharge the lubricant oil flowing through the oil supply flow passage 18 to the internal space 170.

In the depicted embodiment, the introduction port 181 is disposed at an upper part of the bearing housing 17, and the discharge port 182 is disposed below the introduction port 181. The oil supply flow passage 18 is configured to let the lubricant oil introduced into the oil supply flow passage 18 from the introduction port 181 flow through the oil supply flow passage 18 toward the discharge port 182, and get discharged to the internal space 170 from the discharge port 182.

Figure 2:
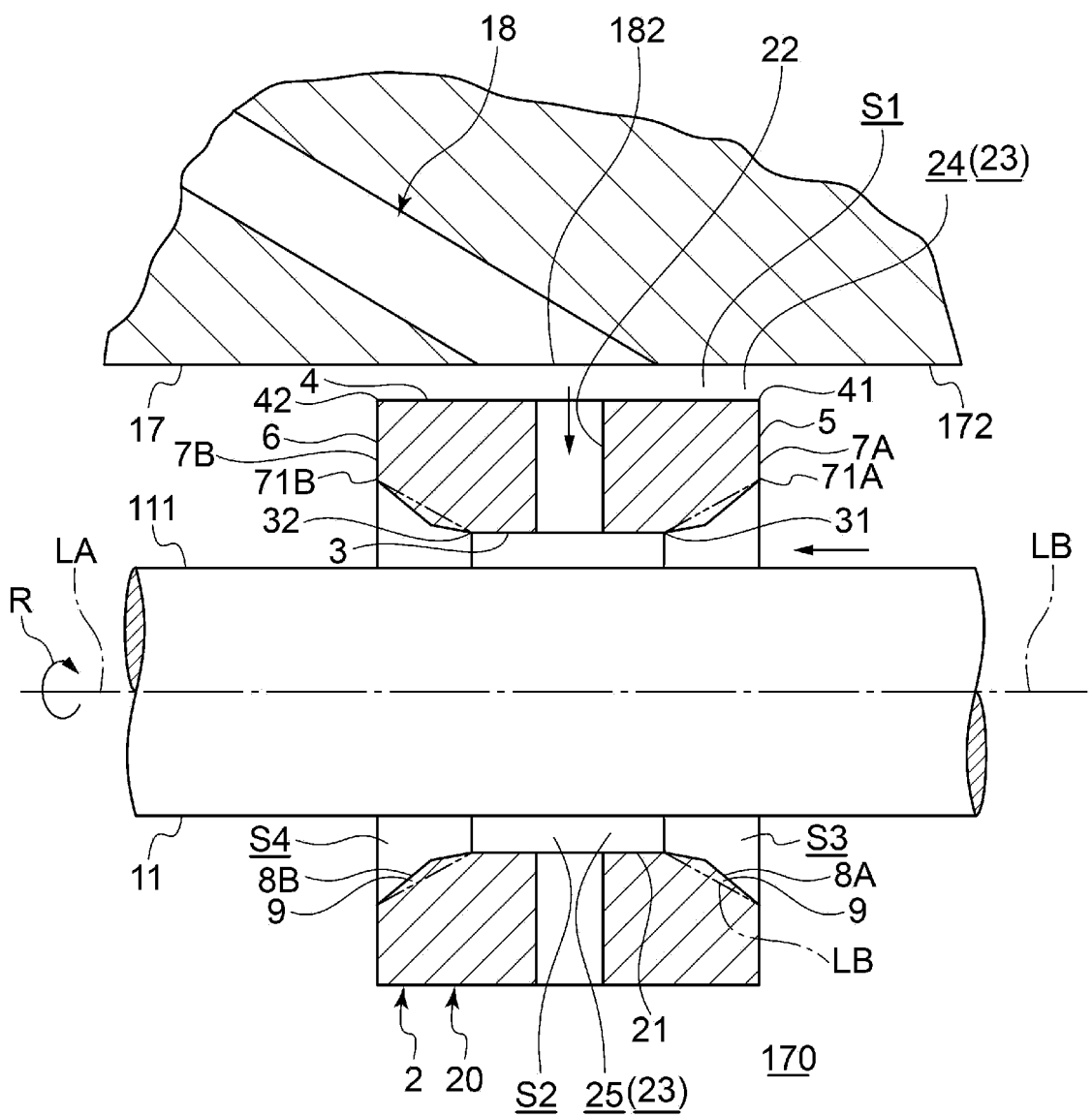
FIG. 2 is a schematic partial enlarged cross-sectional view showing an enlarged area in the vicinity of the floating bush bearing depicted in FIG. 1.
Figure 3:
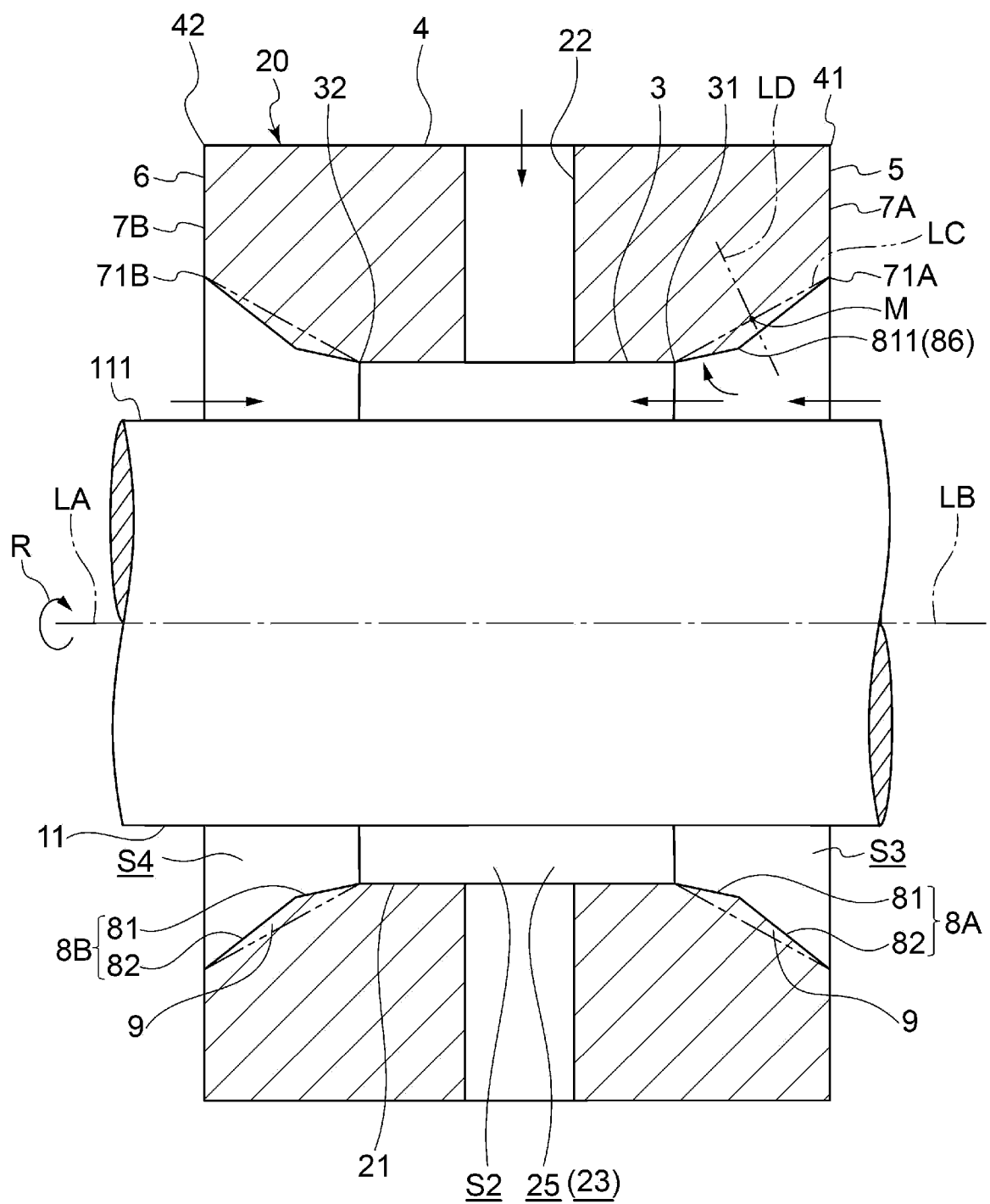
FIG. 3 is a schematic cross-sectional view of a floating bush bearing according to an embodiment, taken along the axis of the floating bush bearing.
Figure 4:
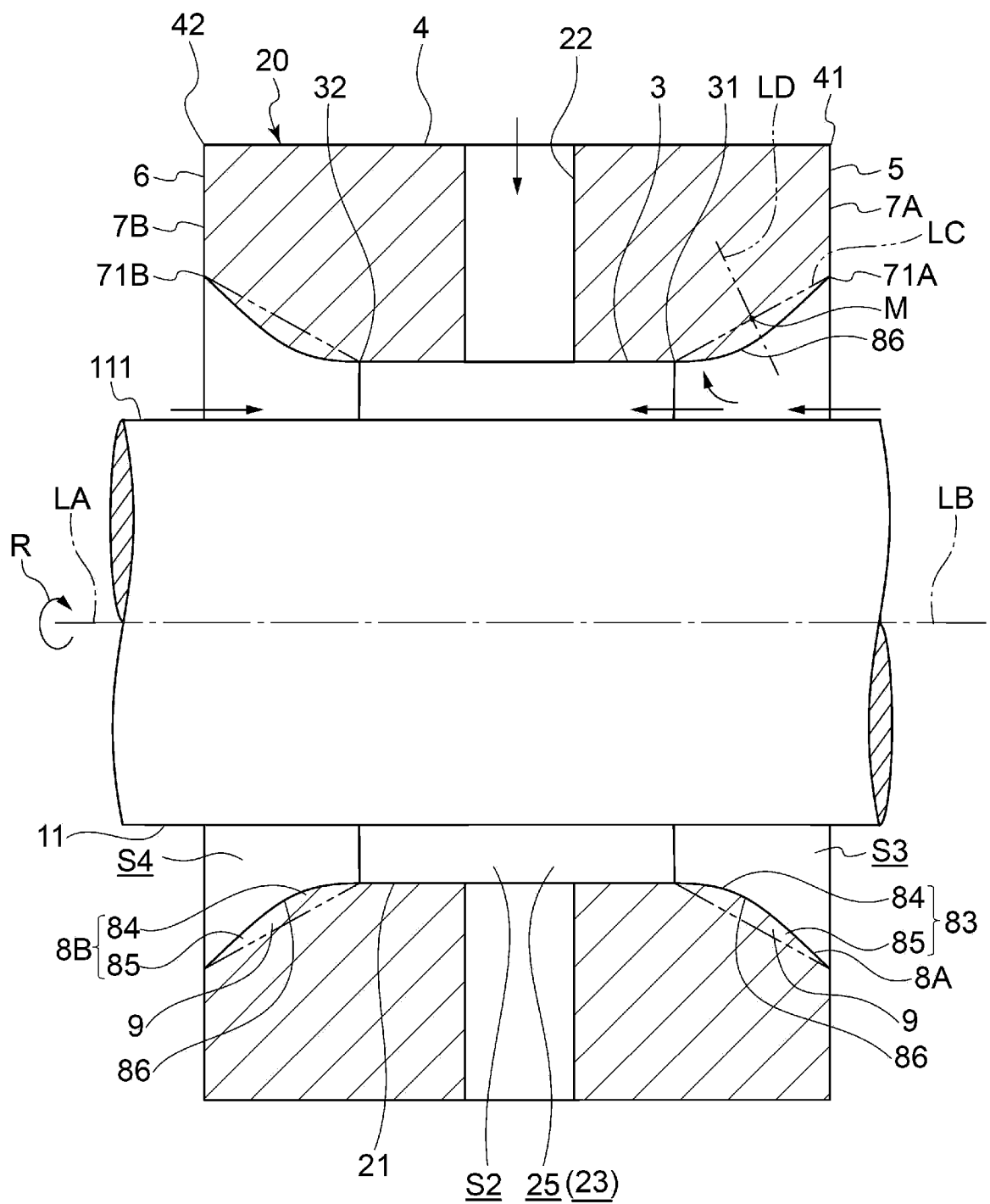
FIG. 4 is a schematic cross-sectional view of a floating bush bearing according to an embodiment, taken along the axis of the floating bush bearing.
Figure 5:
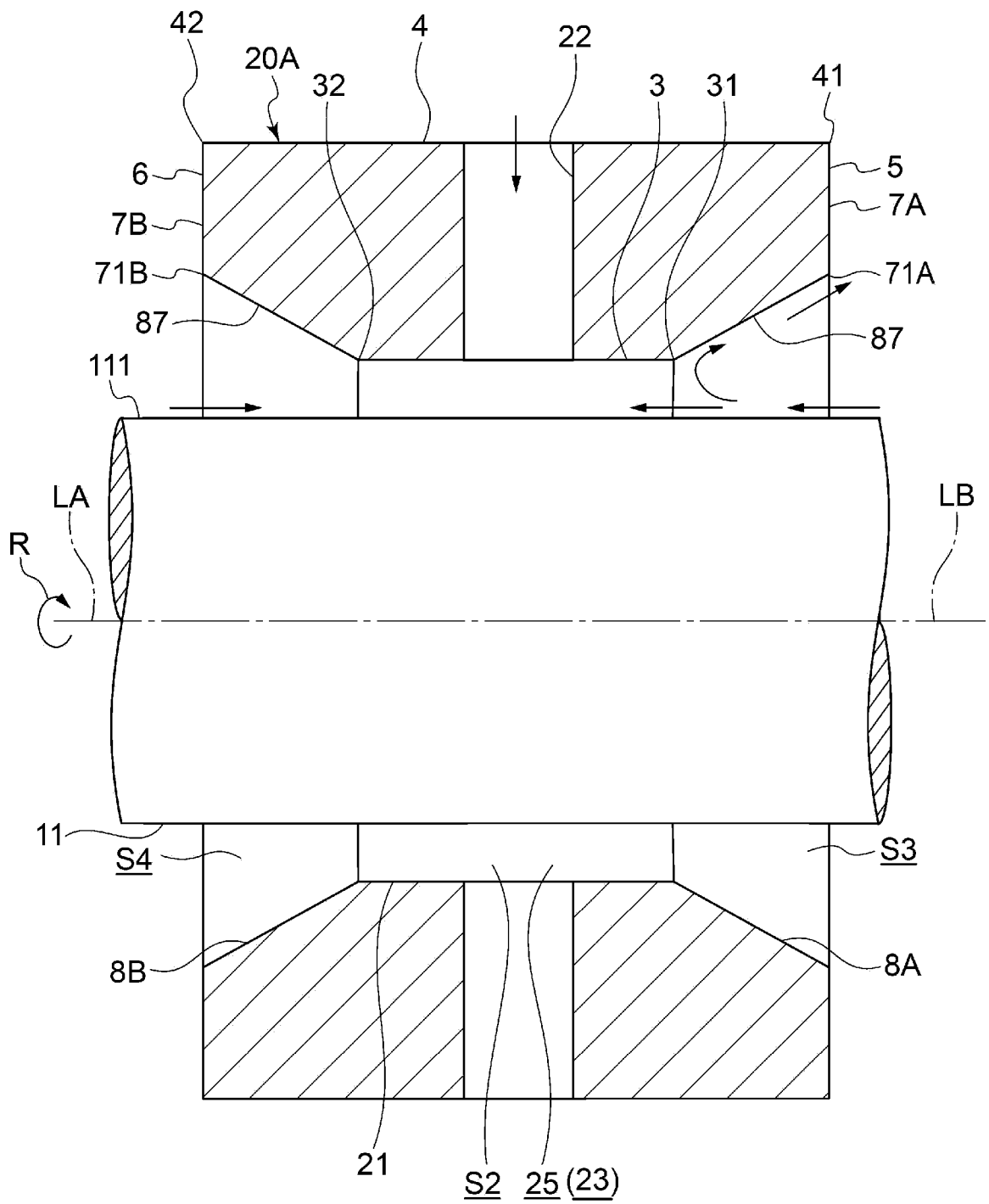
FIG. 5 is a schematic cross-sectional view of a floating bush bearing according to a comparative example, taken along the axis of the floating bush bearing.

FIG. 2 is a schematic partial enlarged cross-sectional view showing an enlarged area in the vicinity of the floating bush bearing depicted in FIG. 1. FIGS. 3 and 4 are each a schematic cross-sectional view of a floating bush bearing according to an embodiment, taken along the axis of the floating bush bearing. FIG. 5 is a schematic cross-sectional view of a floating bush bearing according to a comparative example, taken along the axis of the floating bush bearing. FIGS. 3 to 5 each show a state in which the rotational shaft 11 is inserted into the insertion hole 21, as in FIG. 2.

As depicted in FIGS. 2 to 4, the floating bush body part 20 is formed to have a cylindrical shape having an insertion hole 21 into which the rotational shaft 11 is inserted. The floating bush body part 20 includes an inner peripheral surface 3, an outer peripheral surface 4, and a pair of axial end surfaces 5, 6.

As depicted in FIGS. 2 to 4, the inner peripheral surface 3 and the outer peripheral surface 4 extend along the axial direction of the floating bush body part 20 (direction of extension of the axis LB). The outer peripheral surface 4 has a greater width dimension than the inner peripheral surface 3.

As depicted in FIGS. 2 to 4, the floating bush body part 20 has a plurality of oil supply holes 22 formed thereon, at intervals from one another in the circumferential direction of the floating bush body part 20. The oil supply holes 22 bring the inner peripheral surface 3 and the outer peripheral surface 4 into communication.

In an embodiment, the oil supply hole 22 is formed to have a linear shape along the radial direction of the floating bush body part 20.

Furthermore, in an embodiment, the oil supply hole 22 is formed to have a linear shape along a direction orthogonal to the radial direction of the floating bush body part 20, such that an opening of the oil supply hole 22 formed on the inner peripheral surface 3 is positioned at the downstream side of an opening of the oil supply hole 22 formed on the outer peripheral surface 4, in the rotational direction of the floating bush body part 20 (the same direction as the rotational direction R of the rotational shaft 11).

The oil supply hole 22 is formed to have a linear shape, and thus it is possible to form the oil supply hole 22 easily by machine processing from a side of the outer peripheral surface 4 of the floating bush body part 20.

As depicted in FIGS. 2 to 4, the axial end surface 5 connects an end 31 of the inner peripheral surface 3 in the axial direction (the right end in the drawing) and an end 41 of the outer peripheral surface 4 in the axial direction (the left end in the drawing).

As depicted in FIGS. 2 to 4, the axial end surface 6 connects the other end 32 of the inner peripheral surface 3 in the axial direction (the right end in the drawing) and the other end 41 of the outer peripheral surface 4 in the axial direction (the left end in the drawing).

As depicted in FIGS. 2 to 4, the axial end surface 5 has a vertical surface 7A which extends in a direction orthogonal to the axial direction (radial direction) toward the radially inner side from the end 41 of the outer peripheral surface 4, and an oblique surface 8A which extends from the radially inner end 71A of the vertical surface 7A to the end 31 of the inner peripheral surface 3.

As depicted in FIGS. 2 to 4, the axial end surface 6 has a vertical surface 7B which extends in a direction orthogonal to the axial direction (radial direction) toward the radially inner side from the other end 41 of the outer peripheral surface 4, and an oblique surface 8B which extends from the radially inner end 71B of the vertical surface 7B to the other end 32 of the inner peripheral surface 3.

Each of the oblique surface 8A and the oblique surface 8B may include not only a linearly oblique surface but an oblique surface of any curved surface shape such as a convex curved surface and a concave curved surface, and may include a combination of more than one of the above.

The floating bush body part 20 is, as depicted in FIG. 2, disposed in a state in which the rotational shaft 11 is inserted into the insertion hole 21 so as to be relatively rotatable, inside the above described internal space 170. The floating bush body part 20 is disposed so as to be relatively rotatable with respect to the inner surface 172 of the bearing housing 17 that defines the internal space 170.

As depicted in FIG. 2, a gap S1 is formed between the inner surface 172 of the bearing housing 17 that defines the internal space 170 and the outer peripheral surface 4 of the floating bush body part 20.

Furthermore, as depicted in FIGS. 2 to 4, a gap S2 is formed between the inner peripheral surface 3 of the floating bush body part 20 and the outer peripheral surface 111 of the rotational shaft 11. Furthermore, gaps S3, S4 are formed between the oblique surfaces 8A, 8B of the floating bush body part 20, respectively, and the outer peripheral surface 111 of the rotational shaft 11.

As depicted in FIG. 2, the discharge port 182 is formed to face the gap S1, and the oil supply flow passage 18 and the gap S1 are in communication. The lubricant oil flowing through the oil supply flow passage 18 passes through the discharge port 182, and flows into the gap S1. A part of the lubricant oil in the gap S1 passes through the oil supply holes 22 of the floating bush body part 20 and flows into each of the gaps S2 to S4. Furthermore, another part of the lubricant oil in the gap S1 flows along the vertical surfaces 7A, 7B of the axial end surfaces 5, 6, and then flows into each of the gaps S2 to S4 from the outer side in the axial direction of the floating bush body part 20.

As depicted in FIG. 2, the floating bush bearing 2 includes the above described floating bush body part 20, the bearing housing 17, and a working fluid 23 (lubricant oil). The working fluid 23 includes a working fluid 24 (lubricant oil) filled in the above described gap S1, and a working fluid 25 (lubricant oil) filled in each of the above described gaps S2 to S4.

The floating bush body part 20 is configured to support the rotational shaft 11 while rotating in a gap (internal space 170) between the rotational shaft 11 and the bearing housing 17 filled with the working fluid 23.

Specifically, as the supercharger 1 operates and the turbine wheel 13 is rotary driven, the rotational shaft 11 to which the turbine wheel 13 is mounted rotates at a high speed and rotary drives the compressor wheel 12. As the rotational shaft 11 rotates at a high speed, the floating bush body part 20 also rotates in conjunction with the high-speed rotation of the rotational shaft 11. Thus, the working fluid 24 filling the gap S1 forms an oil film between the inner surface 172 of the bearing housing 17 and the outer peripheral surface 4 of the floating bush body part 20, and the working fluid 25 filling each of the above described gaps S2 to S4 forms an oil form between each of the inner peripheral surface 3 and the oblique surfaces 8A, 8B of the floating bush body part 20 and the outer peripheral surface 111 of the rotational shaft 11. Thus, the rotational shaft 11 is supported without making contact with the floating bush body part 20, and the floating bush body part 20 is supported without making contact with the bearing housing 17.

In some embodiments, as depicted in FIGS. 2 to 4, the above described floating bush bearing 2 includes the above described floating bush body part 20, and the floating bush body part 20 includes the above described inner peripheral surface 3, the above described outer peripheral surface 4, and the above described axial end surface 5 including the vertical surface 7A and the oblique surface 8A. The above described oblique surface 8A has, as depicted in FIGS. 2 to 4, a protruding portion 9 which protrudes from a virtual line LC linearly connecting the radially inner end 71A of the vertical surface 7A and the end 31 of the inner peripheral surface 3.

When the rotational shaft 11 rotates at a high speed, the lubricant oil positioned between the oblique surface 8A of the floating bush body part 20 and the outer peripheral surface 111 of the rotational shaft 11 (gap S3) has a higher pressure at the radially inner side than the radially outer side, and thus the pressure difference generates a flow that flows toward the radially outer side.

As depicted in FIG. 5, the floating bush body part 20A of the floating bush bearing 2A according to a comparative example is different from the above described floating bush body part 20 in that the above described oblique surface 8A does not have the protruding portion 9. The floating bush body part 20A includes a linear oblique surface 87 which linearly connects the radially inner end 71A of the vertical surface 7A and the end 31 of the inner peripheral surface 3. In this case, in the gap S3 described above, most of the lubricant oil flowing along the rotational shaft 11 from the axially outer side toward the axial center side turns outward in the radial direction due to the pressure difference in the radial direction, and flows backward along the linear oblique surface 87 toward the outer side in the axial direction, which may cause insufficiency in the supply amount of the lubricant oil to the gap S2. When the supply amount of the lubricant oil to the gap S2 is insufficient, the liquid film becomes thinner, which may cause seizure or damage to the floating bush body part 20A.

With the above configuration, the oblique surface 8A of the floating bush bearing 2 has the protruding portion 9 protruding from the virtual line LC (corresponding to the linear oblique surface 87 depicted in FIG. 5) linearly connecting the radially inner end 71A of the vertical surface 7A and the end 31 of the inner peripheral surface 3. Thus, it is possible to suppress a reverse flow of the lubricant oil, positioned between the oblique surface 8A of the floating bush body part 20 and the outer peripheral surface 111 of the rotational shaft 11 (gap S3), that flows backward toward the outer side in the axial direction along the oblique surface 8A. By suppressing a reverse flow of the lubricant oil flowing along the axial direction from the outer side of the axial direction, it is possible to increase the supply amount of the lubricant oil to the gap S2 between the inner peripheral surface 3 of the floating bush body part 20 and the outer peripheral surface 111 of the rotational shaft 11, and thereby prevent seizure and damage to the floating bush body part 20.

In some embodiments, as depicted in FIG. 3, the above described oblique surface 8A includes an axial center side linear portion 81 which extends linearly from the end 31 of the inner peripheral surface 3 and which is formed to have a smaller obliquity angle with respect to the axis LB of the floating bush body part 20 than the virtual line LC; and an axial end side linear portion 82 which is formed so as to linearly connect a tip end 811 of the axial center side linear portion 81 and the radially inner end 71A of the vertical surface 7A. In this case, the protruding portion 9 is formed from the end 31 of the inner peripheral surface 3 to the radially inner end 71A of the vertical surface 7A.

With the above configuration, the oblique surface 8A has the axial center side linear portion 81 extending linearly from the end 31 of the inner peripheral surface 3 and having a smaller obliquity angle with respect to the axis LB of the floating bush body part 20 than the virtual line LC. Thus, it is possible to suppress a reverse flow of the lubricant oil, positioned between the oblique surface 8A of the floating bush body part 20A and the outer peripheral surface 111 of the rotational shaft 11 (gap S3), that flows backward toward the outer side in the axial direction along the axial center side linear portion 81 (oblique surface 8A).

Furthermore, the oblique surface 8A includes the axial end side linear portion 82 formed so as to linearly connect the tip end 811 of the axial center side linear portion 81 and the radially inner end 71A of the vertical surface 7A. The axial end side linear portion 82 has a larger obliquity angle with respect to the axis LB of the floating bush body part 20 than the virtual line LC, and thus it is possible to increase the introduction amount of the lubricant oil flowing along the axial direction from the outer side in the axial direction, and thereby increase the supply amount of the lubricant oil to the above described gap S2. Furthermore, the axial end side linear portion 82 has a greater obliquity angle with respect to the axis LB of the floating bush body part 20 than the axial center side linear portion 81, and thus it is possible to reduce the rotation drag of the rotational shaft 11 compared to a case in which the axial end side linear portion 82 extends along the axial center side linear portion 81, and thereby reduce rotational loss of the rotational shaft 11.

Furthermore, each of the axial center side linear portion 81 and the axial end side linear portion 82 is formed to have a linear shape, and thus it is possible to form each of the axial center side linear portion 81 and the axial end side linear portion 82 by machine processing from the outer side, in the axial direction, of the floating bush body part 20.

In some embodiments, as depicted in FIG. 4, the above described oblique surface 8A includes a concave curved surface portion 83 formed so as to connect the radially inner end 71A of the above described vertical surface 7A and the end 31 of the inner peripheral surface 3. In this case, the protruding portion 9 is formed from the end 31 of the inner peripheral surface 3 to the radially inner end 71A of the vertical surface 7A.

With the above configuration, the oblique surface 8A includes a concave curved surface portion 83 formed so as to connect the radially inner end 71A of the vertical surface 7A and the end 31 of the inner peripheral surface 3. Herein, a portion of the concave curved surface portion 83 positioned at the axial center side of the most protruding portion 86 of the concave curved surface portion 83 from the virtual line LC (a portion whose length in a direction orthogonal to the virtual line LC is the largest) is an axial center side concave curved surface portion 84, and a portion positioned at the axial end side of the most protruding portion 86 is an axial end side concave curved surface portion 85. The axial center side concave curved surface portion 84 has a tangent to the axial center side concave curved surface portion 84 having a smaller obliquity angle with respect to the axis LB of the floating bush body part 20 than the virtual line LC. Thus, it is possible to effectively suppress a reverse flow of the lubricant oil, positioned between the axial center side concave curved surface portion 84 of the floating bush body part 20 and the outer peripheral surface 111 of the rotational shaft 11, that flows backward toward the outer side in the axial direction along the axial center side concave curved surface portion 84 (oblique surface 8A).

Furthermore, the axial end side concave curved surface portion 85 has a tangent to the axial end side concave curved surface portion 85 having a larger obliquity angle with respect to the axis LB of the floating bush body part 20 than the virtual line LC, and thus it is possible to increase the introduction amount of the lubricant oil flowing along the axial direction from the outer side in the axial direction, and increase the supply amount of the lubricant oil to the above described gap S2. Furthermore, the axial end side concave curved surface portion 85 has a tangent to the axial end side concave curved surface portion 85 having a greater obliquity angle with respect to the axis LB of the floating bush body part 20 than the axial center side concave curved surface portion 84, and thus it is possible to reduce the rotation drag of the rotational shaft 11 compared to a case in which the axial end side concave curved surface portion 85 extends along the axial center side concave curved surface portion 84, and thereby reduce rotational loss of the rotational shaft 11.

In some embodiments, as depicted in FIGS. 3 and 4, when a line passing through the midpoint M of the above described virtual line LC and being orthogonal to the virtual line LC is a virtual normal LD, the protruding portion 9 is configured such that the most protruding portion 86 from the above described virtual line LC is positioned at the axial center side of the virtual normal LD.

In an embodiment depicted in FIG. 3, the tip end 811 of the above described axial center side linear portion 81 is the above described most protruding portion 86. Furthermore, in an embodiment depicted in FIG. 4, the border between the above described axial center side concave curved surface portion 84 and the above described axial end side concave curved surface portion 85 is the above described most protruding portion 86.

With the above configuration, the protruding portion 9 is configured such that the most protruding portion 86 from the virtual line LC is positioned at the axial center side of the virtual normal LD. That is, the axial end side linear portion 82 and the axial end side concave curved surface portion 85 of the oblique surface 8A become longer. In this case, compared to a case in which the most protruding portion 86 is positioned at the axial end side of the virtual normal LD, it is possible to increase the introduction amount of the lubricant oil flowing along the axial direction from the outer side in the axial direction, and increase the supply amount of the lubricant oil to the above described gap S2. Furthermore, with the above configuration, compared to a case in which the most protruding portion 86 is positioned at the axial end side of the virtual normal LD, it is possible to reduce rotational drag of the rotational shaft 11, and thus it is possible to reduce rotational loss of the rotational shaft 11.

In the above described embodiments, the above described oblique surface 8A has the protruding portion 9. Nevertheless, in some embodiments, as depicted in FIGS. 3 and 4, the above described oblique surface 8B may be provided with the above described protruding portion 9.

In an embodiment, both of the above described oblique surface 8A and the above described oblique surface 8B have the above described protruding portion 9. In this case, the oblique surface 8A and the oblique surface 8B have the same shape, and thus it is possible to suppress vibration upon rotation of the floating bush body part 20, compared to a case in which one of the oblique surface 8A or the oblique surface 8B has the protruding portion 9.

Figure 6:
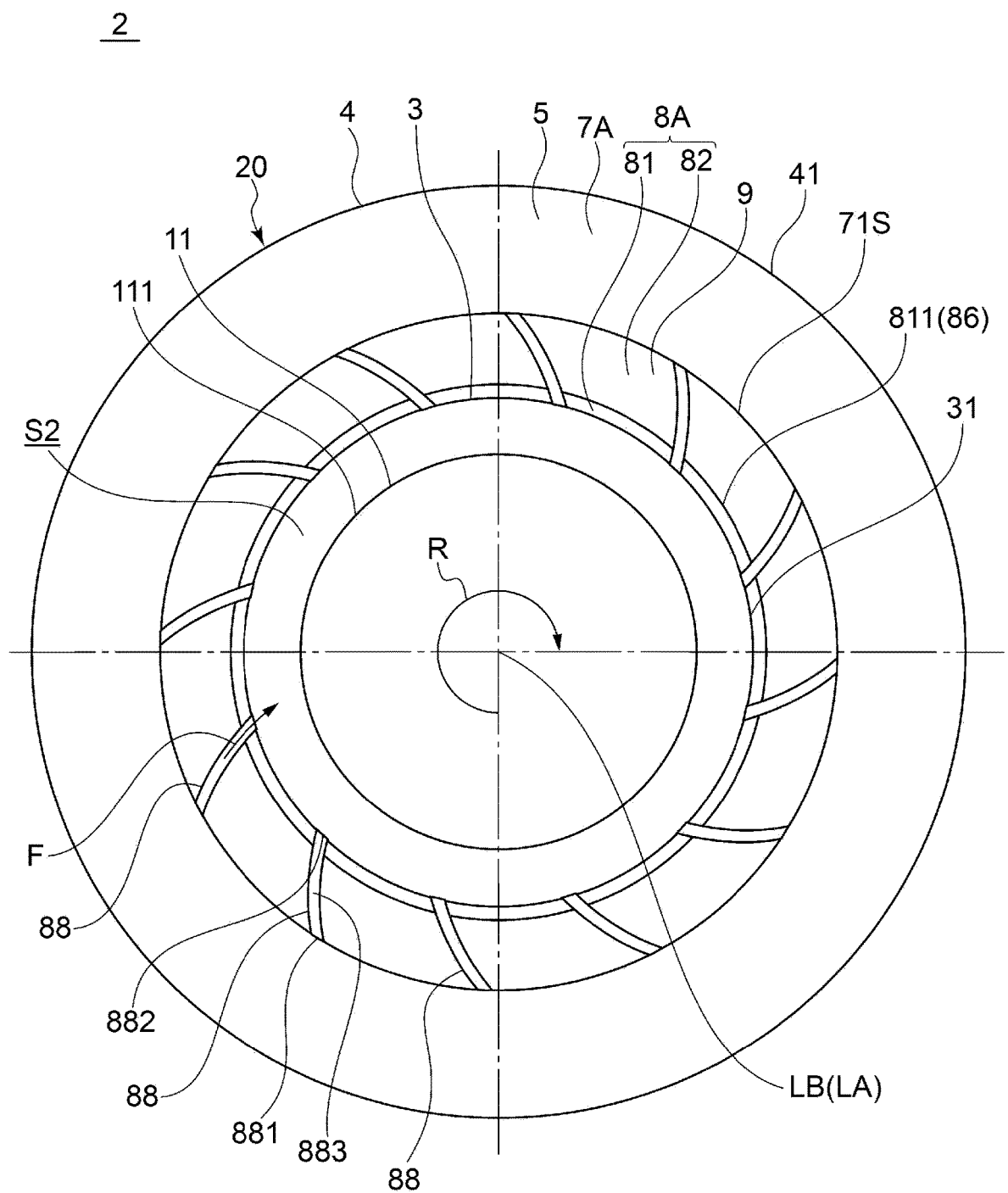
FIG. 6 is a schematic cross-sectional view of a floating bush bearing according to an embodiment, as seen in its axial direction.

FIG. 6 is a schematic cross-sectional view of a floating bush bearing according to an embodiment, as seen in its axial direction.

In some embodiments, as depicted in FIG. 6, the above described oblique surface 8A has at least one spiral groove 88 which extends, while turning toward the radially inner side, in the rotational direction of the floating bush bearing 2 (the same direction as the rotational direction R of the rotational shaft 11).

In the depicted embodiment, as depicted in FIG. 6, the spiral groove 88 has an end 881 (radially outer end), in the length direction, formed on the radially inner end 71A of the above described vertical surface 7A, and the other end 882 (radially inner end), in the length direction, formed on the first end 31 of the above described inner peripheral surface 3. That is, the spiral groove 88 is formed from the radially inner end 71A of the vertical surface 7A to the end 31 of the inner peripheral surface 3.

Furthermore, in the depicted embodiment, as depicted in FIG. 6, the spiral groove 88 is configured to have the same depth as the above described virtual line LC. That is, the bottom surface 883 of the spiral groove 88 extends on the virtual plane formed by the above described virtual line LC.

With the above configuration, the oblique surface 8A has the at least one spiral groove 88 which extends in the rotational direction of the floating bush bearing 2 while turning toward the radially inner side, and thus, when the floating bush bearing 2 rotates, a force F acts on the lubricant oil entering the inside of the spiral groove 88, such that the force F pushes the lubricant oil toward the downstream side in the rotational direction from the wall surface of the spiral groove 88. Thus, with the above configuration, it is possible to increase the supply amount of the lubricant oil to the above described gap S2, compared to a case in which the spiral groove 88 is not provided.

Furthermore, in the embodiment depicted in FIG. 6, the oblique surface 8A including the axial center side linear portion 81 and the axial end side linear portion 82, as depicted in FIG. 3, have the spiral groove 88. Nevertheless, in some other embodiments, the oblique surface 8A having the concave curved surface portion 83 as depicted in FIG. 4 may include the spiral groove 88.

In the above described embodiments, the above described oblique surface 8A has the spiral groove 88. Nevertheless, in some embodiments, the above described oblique surface 8B may be provided with the above described spiral groove 88. In an embodiment, both of the above described oblique surface 8A and the above described oblique surface 8B have the above described spiral groove 88.

As depicted in FIG. 1, a supercharger 1 according to some embodiments includes the above described rotational shaft 11, the above described compressor wheel 12 mounted to an end of the rotational shaft 11, the floating bush body part 20 of the above described floating bush bearing 2, and the above described housing 14 configured to accommodate the rotational shaft 11, the compressor wheel 12, and the floating bush body part 20.

With the above configuration, the supercharger 1 includes the rotational shaft 11, the compressor wheel 12, the floating bush body part 20 of the floating bush bearing 2, and the housing 14. Thus, it is possible to increase the supply amount of the lubricant oil to the gap S2 between the inner peripheral surface 3 of the floating bush body part 20 and the outer peripheral surface 111 of the rotational shaft 11, and thereby prevent seizure and damage to the floating bush body part 20.

Embodiments of the present invention were described in detail above, but the present invention is not limited thereto, and various amendments and modifications may be implemented.

In the above described embodiments, the supercharger 1 is described as a turbocharger including the compressor wheel 12 and the turbine wheel 13, as an example. Nevertheless, the supercharger 1 is not limited to a turbocharger, and can be modified in various ways. For instance, the supercharger 1 may be a supercharger other than a turbocharger. Furthermore, the supercharger 1 may not include the above described turbine wheel 13. For instance, a supercharger 1 that does not include the turbine wheel 13 may be an electric compressor configured to rotate the compressor wheel 12 with a non-depicted electric motor.

REFERENCE SIGNS LIST

1 Supercharger
11 Rotational shaft
111 Outer peripheral surface
12 Compressor wheel
13 Turbine wheel
14 Housing
15 Compressor housing
16 Turbine housing
17 Bearing housing
170 Internal space
171 Outer surface
172 Inner surface
18 Lubricant oil supply flow passage
181 Introduction port
182 Discharge port
2 Floating bush bearing
2A Floating bush bearing according to a comparative example
2 Floating bush body part
20A Floating bush body part according to a comparative example
21 Insertion hole
22 Oil supply hole
23 to 25 Working fluid
3 Inner peripheral surface
31 End
32 Other end
4 Outer peripheral surface
41 End
42 Other end
5, 6 Axial end surface
7A, 7B Vertical surface
71A, 71B Radially inner end
8A, 8B Oblique surface
81 Axial center side linear portion
811 Tip end
82 Axial end side linear portion
83 Concave curved surface portion
84 Axial center side concave curved surface portion
85 Axial end side concave curved surface portion
86 Most protruding portion
87 Linear oblique surface
88 Spiral groove
9 Protruding portion
LA Axis of rotational shaft
LB Axis of floating bush body part
LC Virtual line
LD Virtual normal
M Midpoint
R Rotational direction

The invention claimed is:

1. A floating bush bearing configured to support a rotational shaft rotatably, the floating bush bearing comprising:
a floating bush body part formed to have a cylindrical shape having an insertion hole through which the rotational shaft is inserted,
wherein the floating bush body part includes:
an inner peripheral surface;
an outer peripheral surface having a greater width dimension than the inner peripheral surface in an axial direction of the floating bush body part; and
an axial end surface which connects an end of the inner peripheral surface and an end of the outer peripheral surface, the axial end surface including a vertical surface extending along a direction orthogonal to the axial direction from the end of the outer peripheral surface toward a radially inner side and an oblique surface extending from a radially inner end of the vertical surface toward the end of the inner peripheral surface, and
wherein the oblique surface has a protruding portion protruding from a virtual line which linearly connects the radially inner end of the vertical surface and the end of the inner peripheral surface.

2. The floating bush bearing according to claim 1, wherein the oblique surface includes:
an axial center side linear portion which extends linearly from the end of the inner peripheral surface and which is formed to have a smaller obliquity angle with respect to an axis of the floating bush body part than the virtual line; and
an axial end side linear portion which is formed so as to linearly connect a tip end of the axial center side linear portion and the radially inner end of the vertical surface.

3. The floating bush bearing according to claim 2, wherein, when a line passing through a midpoint of the virtual line and being orthogonal to the virtual line is a virtual normal, the protruding portion is configured such that a portion most protruding from the virtual line is positioned at the side closer to an axial center with respect to the virtual normal.

4. The floating bush bearing according to claim 1, wherein the oblique surface includes a concave curved surface portion formed so as to connect the radially inner end of the vertical surface and the end of the inner peripheral surface.

5. The floating bush bearing according to claim 1, wherein the oblique surface has at least one spiral groove which extends in a rotational direction of the floating bush bearing while turning toward the radially inner side.

6. A supercharger, comprising:
a rotational shaft;

a compressor wheel mounted to an end of the rotational shaft;
the floating bush body part of the floating bush bearing according to claim 1; and
a housing configured to house the rotational shaft, the compressor wheel, and the floating bush body part.

\* \* \* \* \*